United States Patent [19]

O'Brien

[11] Patent Number: 5,796,961
[45] Date of Patent: Aug. 18, 1998

[54] HEURISTIC BUS ACCESS ARBITER

[75] Inventor: Rita M. O'Brien, Austin, Tex.

[73] Assignee: Advanced Micro Devices, Inc., Sunnyvale, Calif.

[21] Appl. No.: 954,617

[22] Filed: Oct. 20, 1997

Related U.S. Application Data

[63] Continuation of Ser. No. 715,238, Sep. 16, 1996, abandoned, which is a continuation of Ser. No. 359,287, Dec. 19, 1994, abandoned.

[51] Int. Cl.$^6$ .................... G06F 13/18; G06F 13/20
[52] U.S. Cl. .................... 395/287; 395/299; 395/861
[58] Field of Search ...................... 395/280, 287, 395/872, 299, 861, 200.65; 370/447

[56] References Cited

U.S. PATENT DOCUMENTS

| | | | |
|---|---|---|---|
| 4,285,038 | 8/1981 | Suzuki et al. | 395/325 |
| 5,072,420 | 12/1991 | Conley et al. | 395/425 |
| 5,247,617 | 9/1993 | Olson | 395/250 |
| 5,392,033 | 2/1995 | Oman et al. | 340/825.5 |
| 5,410,652 | 4/1995 | Leach et al. | 395/250 |

FOREIGN PATENT DOCUMENTS

| | | |
|---|---|---|
| 5216694 | 8/1993 | Japan. |
| 2 001 463 | 1/1979 | United Kingdom. |
| 94/00834 | 1/1994 | WIPO. |

OTHER PUBLICATIONS

IBM Technical Disclosure Bulletin, vol. 37, No. 10, Oct. 1994, New York; pp. 461 & 462 "Programmable Dynamically-Alterable Request Priority Levels".

Primary Examiner—Gopal C. Ray
Attorney, Agent, or Firm—Foley & Lardner

[57] ABSTRACT

An arbiter connects a plurality of devices to a bus. The arbiter determines priority among the devices based on the relative need of the devices. Relative need is determined for each device based on the fullness of a buffer, such as a first-in first-out buffer, corresponding to each device. A gauge informs the arbiter of the fullness value for each buffer from which relative need, and hence priority, is calculated. In addition, the arbiter can incorporate the speed of each device's buffer into its priority determination. The relative device priorities can thus be changed dynamically as the buffers associated with the devices read and write data via the bus. Similarly, the relative priority of a given device can change when the device changes from an input mode to an output or from an output mode to an input mode.

7 Claims, 1 Drawing Sheet

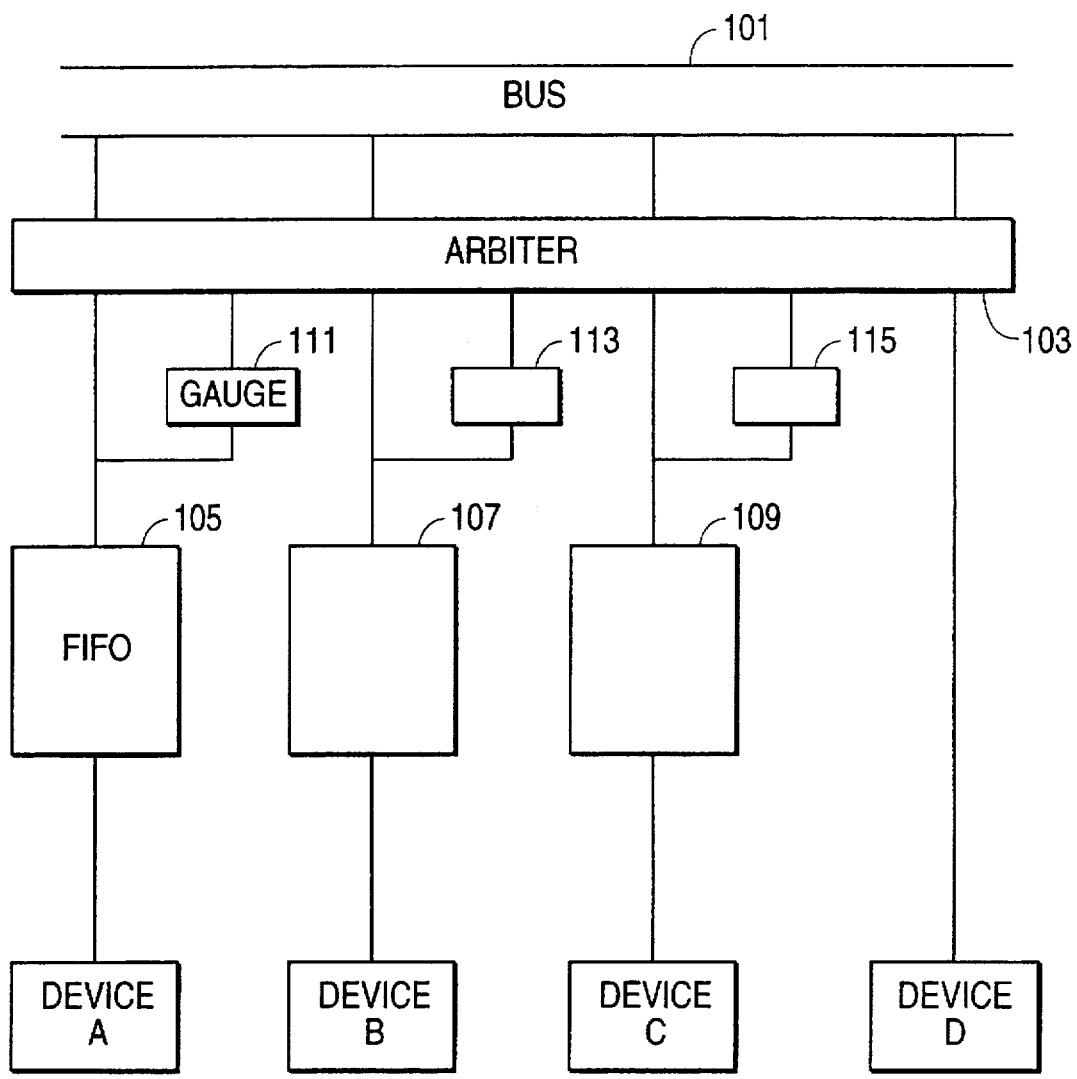

HEURISTIC BUS ACCESS ARBITER

This application is a continuation of application Ser. No. 08/715,238, filed Sep. 16, 1996, abandoned, which is a continuation of application Ser. No. 08/359,287, filed Dec. 19, 1994, now abandoned.

BACKGROUND OF THE INVENTION

When many devices are connected to a data bus, such as in a multi-media application, conflicts will occur where two devices request access to the bus at the same time. To resolve these conflicts, arbiters have been developed to grant bus access to the device having the highest priority. When two devices are in contention for the bus, the arbiter first gives access to the device with the higher priority of the two and subsequently gives access to the device with the lower priority.

In a system with such an arbiter, a device with a very high priority gets frequent access to the bus while a device with a low priority will get infrequent access to the bus. This can present a problem when the devices are assigned their priorities during system initialization or boot-up such that the relative priorities of the devices do not change over time. A situation can exist where a low priority device needs access to the bus in order to continue functioning but cannot obtain access because a high priority device which does not necessarily need access happens to be requesting bus access coincidentally. Thus, although the system is granting access on a priority basis, inefficiencies can result where low priority devices experience idle time.

SUMMARY OF THE INVENTION

It is thus an object of the present invention to improve the efficiency of systems where multiple devices request access to a data bus by providing an arbiter with a capability for updating the priority of the respective devices during processing. More specifically, the arbiter of the present invention will utilize gauges indicating the fullness of memories, such as first-in first-out (FIFO) memories associated with the contending devices to determine the relative priorities of the contending devices.

It is a further object of the present invention to provide a method of granting bus access to a plurality of devices via a bus arbiter which determines priority based upon the fullness of memories associated with the devices.

It is a further object of the invention to provide an arbiter which calculates the priority of each device based not only on the fullness of its memory but also on the relative speed of the device.

One embodiment of the present invention comprises a bus connected to a plurality of devices through an arbiter. At least one of the devices has a corresponding gauge indicating a value representing the fullness of an associated memory. The arbiter thus grants access to the bus based on the value of the gauge. This embodiment can be expanded to associate a memory and corresponding gauge to each device. This embodiment is applicable to situations where the devices are all input devices, all output devices, a mix of input devices and output devices, or include input/output devices.

In another embodiment of the invention, the gauge associated with each device indicates a percentile value which indicates the percentage of the associated memory that is full. The arbiter then determines the priority of each device by calculating a need value for each device. For input devices and input/output devices in an input mode, the need value is calculated by subtracting the percentile value from 100. For output devices and input/output devices in an output mode the need value equals the percentile value. The arbiter then grants priority to the devices based on their respective need values.

BRIEF DESCRIPTION OF THE DRAWINGS

These and other objects of the invention will become apparent from a review of the drawings wherein:

FIG. 1 shows an example of the invention where four devices are connected to a bus via an arbiter.

DETAILED DESCRIPTION OF THE PREFERRED EMBODIMENTS

FIG. 1 shows four devices A, B, C and D connected to bus 101 through arbiter 103. Devices A, B, C and D can be any devices which communicate via bus 101. Each of these devices can be connected to bus 101 via a buffer. For example, as shown in FIG. 1, device A is further connected via buffer 105, device B is further connected via buffer 107 and device C is further connected via buffer 109. Buffers 105, 107 and 109 are, for example, first-in first-out (FIFO) buffers.

Buffer 105 is also connected to arbiter 101 through gauge 111. Similarly, buffers 107 and 109 are connected to arbiter 103 via gauges 113 and 115 respectively. Gauges 111, 113 and 115 provide arbiter 103 with information on the respective status of buffers 105, 107 and 109. Specifically, gauges 111, 113 and 115 inform arbiter 103 of the fullness of buffers 105, 107 and 109 respectively.

For the example of FIG. 1, assume buffer 105 is a 16 byte FIFO and that device A periodically reads data through bus 101 to fill buffer 105. Further, assume buffer 107 is a 1K byte FIFO that periodically writes through bus 101. Further, assume buffer 109 is a 128 byte FIFO that periodically writes through bus 101. Finally, assume device D has no buffer because it does not transfer large amounts of information.

In this example, gauges 111, 113 and 115 would indicate the fullness of buffers 105, 107 and 109. This indication can be in fractional terms, such as ½ full, ¾ full, etc. or in percentage terms such as 50% full, 75% full, etc.

Arbiter 103 provides access to bus 101 for devices A, B, C and D in accordance with a priority which is based on the gauge readings for the individual buffers. Thus, the relative priority of the devices changes over time.

In the example discussed above, therefore, a traditional arbiter would be set upon system initialization to give, for example, buffer 107 the highest priority, buffer 109 the second highest priority, buffer 105 the third highest priority and device D the lowest priority. This priority scheme is based on the size of the respective buffers of the individual devices which is presumably related to the frequency with which the devices must communicate via the bus. Alternatively, a traditional arbiter may be preprogrammed with relative priorities for assignment to the devices. Either way, in a traditional arbiter the devices would maintain their relative priority such that the relative priority could not be dynamically updated over time.

In assigning priority to the respective devices, the present invention is aimed at minimizing the likelihood that any device is idle. Idleness can be viewed as a situation where a device wants to communicate via its buffer, but is unable to do so. For example, if a device wants to write data to bus 101, but its buffer is full, the device can not write the data and is thus idle until its buffer is granted access to bus 101, at which time the buffer would write data to bus 101, yielding buffer capacity, to which the device can then write. Similarly, if a device wants to read data, but its buffer is empty, the device is idle.

To minimize the likelihood of a device being idle, therefore, the arbiter of the present invention considers the device type (write device or read device) as well as the fullness of its buffer when assigning a relative priority to the device. Further, the arbiter of the present invention updates the relative priorities of the devices as the fullness of their buffers changes over time.

Assume, for example, that buffer 107 holds only 100 bytes of data. Thus, gauge 113 would indicate that buffer 107 is only 10% full. Similarly, assume buffer 105 holds 8 bytes such that gauge 111 indicates that buffer 105 is 50% full. Further, assume buffer 109 contains 96 bytes. Thus, gauge 115 would indicate that buffer 109 is 75% full. This situation, using the arbiter of the present invention, would result in device A having the highest priority, device C having the second highest priority and device B having a third highest priority. This can be seen from Table I.

TABLE 1

| Device | Type | buffer capacity | Size buffer contents | Gauge Reading | Priority (conventional) | Priority (present invention) |
|---|---|---|---|---|---|---|
| A | Read | 16 | 8 | 50% | 3 | 1 |
| B | Write | 1K | 100 | 10% | 1 | 3 |
| C | Read | 128 | 96 | 75% | 2 | 2 |
| D | N/A | 0 | N/A | N/A | 4 | 4 |

As can be seen from Table I, in the present invention priority can be set dynamically based on the status of the memories. Thus, priority is not always given to the same device, as in conventional systems where the device with the largest FIFO, for example, may receive priority. A conventional system using such a scheme would give buffer 107 (device B) the highest priority because it has the largest capacity, whereas the present invention grants highest priority to buffer 105 (device A).

Further, in the present invention priority is not necessarily given to the fullest buffer, which would be buffer 109 (device C) in this example. This is because the contending devices are of different types—device B is described in this example as a write device whereas devices A and C are read devices. Instead, as between devices A, B, and C, the present invention grants priority to buffer 105 of device A. This is because device A is a read device and buffer 105 is 50% full. Buffer 105 is therefore 50% away from making device A idle, which would occur if device A wanted to read and buffer 105 were empty.

Device C, another read device is given second priority because buffer 109 is 75% full and thus 75% away from its idle point. Device B, a write device, is given third priority because buffer 107 is 10% full and thus 90% from being 100% full—device B's idle point since when buffer 107 is full device B can't write. Thus, where device B would be given the highest priority via a conventional arbiter due to buffer 107's large capacity, amongst devices A, B and C it is given the lowest priority since, due to the relative fullness of the buffers, it is the furthest of the three devices from reaching its idle point. The amount of data remaining to be processed by a device prior to idleness, as a percentage of the device's total buffer capacity, may be referred to in the context of the invention as "remaining processing capacity".

Thus, as can be seen from the Table I, the present invention assigns priority on the basis of need. For read devices a need value is calculated by subtracting the gauge reading (expressed as a percentile) from 100. For write devices, on the other hand, a need value equals the gauge reading. Thus, relating to devices A, B and C, the information in Table I can be synthesized as shown below in Table II.

TABLE II

| Device | Type | Gauge Reading | Need | Priority |
|---|---|---|---|---|
| A | Read | 50% | 50 | 1 |
| B | Write | 10% | 10 | 3 |
| C | Read | 75% | 25 | 2 |

As can be seen from the above chart, the device with the highest need value receives the highest priority. This provides for a dynamic system which operates in a more efficient manner than a traditionally arbitrated system to minimize idle time of the devices.

Also, for purposes of simplicity, in the examples discussed above each of the devices was assumed to be either a read or a write device. Any or all of the devices may, alternatively, be input/output devices which, at any given time, would be in either an input mode or an output mode. In this case, the arbiter would initially determine the mode of the device to know whether the device's gauge reading equals its need (write mode) or whether 100 minus the device's gauge reading equals its need (read mode). In this case, the need, and therefore the relative priority, of a given device will likely change as a device shifts from a read mode to a write mode or from a write mode to a read mode. For example, a device in a write mode with a 90% full FIFO would have a relatively high priority since its need would be 90. However, if this device shifted to the read mode, its priority would drop to a relatively low priority since its need would be 10 corresponding to the fact that there is 90% of buffer capacity remaining until it achieves an idle state.

In an alternative embodiment, the speed with which a buffer fills or empties can also be a factor in dynamically determining the relative priority among the buffers associated with the devices. Thus, if two devices are of the same type (for example, they are both write devices), each have the same size buffer, and each of the buffers is 50% full, the buffer whose device will fill it faster should be given priority.

For example, presume device X is a hard disk and device Y is a modem. Further, presume both X and Y are writing data, via respective buffers, to a data bus. As a hard drive, device X can fill its buffer much more rapidly than device Y, a modem, can fill its buffer. Thus, although the first embodiment of the invention would view the buffers associated with devices X and Y equally, it would be prudent to grant priority to device X's buffer since it will be filled by device X (placing device X in an idle state) more rapidly than device Y's buffer will be filled by device Y.

A way to view this alternative priority scheme relative to the priority scheme of the first embodiment is to view the basic question the arbiter will consider for each device as it sets priority. In the first embodiment, the arbiter will ask "How far is this buffer from placing its device in an idle state?" The arbiter will then grant access to the buffer which is the closest to placing its device in an idle state (the buffer with the greatest need). In this alternative embodiment, the arbiter will ask "How long until this buffer places its device in an idle state?" The arbiter should then grant access to the buffer which is closest in time to placing its device in an idle state.

In our example, then, although the buffers related to devices X and Y are the same distance from their idle states, device X's buffer is closer in time to placing device X in an idle state since it gets filled faster than device Y's buffer. Thus, device X's buffer should be granted priority.

Now, consider the same devices (X and Y) operating in the opposite direction. Here, both devices are reading data from the bus. Since device X can read from its buffer more quickly than device Y can read from its buffer, if both buffers are 50% full, device X is the closest in time to being idle. Device X's buffer should therefore be granted priority to the bus over device Y's buffer. It can thus be seen that, all other things being equal, the buffer associated with the faster device should be given priority over the buffer associated with the slower device. This is true for the devices being both in a read mode or in a write mode.

Similarly, if various devices are write devices, read devices or read/write devices in either a read mode or a write mode, the speeds at which the devices read from and/or write to their buffers can be stored in the arbiter. The arbiter could then calculate, for each device, the amount of time until the device becomes idle if its buffer is not granted access to the bus. The arbiter would then grant access priority to the buffer associated with the device that would become idle the soonest if access were not granted. The arbiter can then update the relative priorities for the devices based on their speed and buffer capacity, thus minimizing the overall likelihood that any of the devices become idle.

The above embodiment assumes that each of the devices has a single access speed at which it writes to and reads from its buffer. Alternatively, a device may write to its buffer at a different speed from that at which it reads from its buffer. In this case, both the write speed and the read speed can be stored in the arbiter so that the arbiter can properly calculate the amount of time until the device would become idle.

Alternatively, a device can have a variable write speed or read speed. In this case, the device can be connected to the arbiter such that the device can inform the arbiter of its current speed. In this way, the arbiter can properly calculate the amount of time until the device would become idle.

While several embodiments of the invention have been described, it will be understood that it is capable of further modifications, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A method for arbitrating bus access among devices, comprising:

determining unused buffer capacity for each of said devices;

determining, from unused buffer capacity, a remaining processing capacity prior to idleness for each of said devices; and assigning bus access priority to each of said devices in order of remaining processing capacity, wherein a device with lowest remaining processing capacity prior to idleness receives highest bus access priority.

2. The method of claim 1, wherein said determining a remaining processing capacity prior to idleness comprises determining for each of said devices whether operation is occurring in a read mode or a write mode.

3. The method of claim 1, wherein, prior to said assigning bus access priority, said method comprises scaling, by a factor of device operating speed, the remaining processing capacity prior to idleness of each of said devices, the remaining processing capacity prior to idleness thereby representing a remaining time prior to idleness for each of said devices.

4. A system for arbitrating bus access among devices, comprising:

means for determining unused buffer capacity for each of said devices;

means for determining, from unused buffer capacity, a remaining processing capacity prior to idleness for each of said devices; and means for assigning bus access priority to each of said devices in order of remaining processing capacity, wherein a device with lowest remaining processing capacity prior to idleness receives highest bus access priority.

5. The system of claim 4, wherein said means for determining a remaining processing capacity prior to idleness comprises means for determining for each of said devices whether operation is occurring in a read mode or a write mode.

6. The system of claim 4, further comprising means for scaling, by a factor of device operating speed, the remaining processing capacity prior to idleness of each of said devices, the remaining processing capacity prior to idleness thereby representing a remaining time prior to idleness for each of said devices.

7. A method for arbitrating bus access among devices, comprising:

determining unused buffer capacity for each of said devices;

determining, from unused buffer capacity, a remaining processing time prior to idleness for each of said devices; and assigning a bus access priority to each of said devices in order of remaining processing time prior to idleness, wherein a device with lowest remaining processing time prior to idleness receives highest bus access priority.

* * * * *